Dec. 23, 1952    E. A. RUDOLPH    2,622,555
MAYONNAISE APPLICATING APPARATUS
Filed Feb. 1, 1949    2 SHEETS—SHEET 1

INVENTOR.
EDWARD A. RUDOLPH
BY Townsend & Townsend
ATTORNEY

Dec. 23, 1952          E. A. RUDOLPH          2,622,555

MAYONNAISE APPLICATING APPARATUS

Filed Feb. 1, 1949          2 SHEETS—SHEET 2

INVENTOR.
EDWARD A. RUDOLPH
BY
Townsend & Townsend
ATTORNEY

Patented Dec. 23, 1952

2,622,555

UNITED STATES PATENT OFFICE 2,622,555

MAYONNAISE APPLICATING APPARATUS

Edward Albert Rudolph, Richmond Annex, Calif.

Application August 1, 1949, Serial No. 108,028

5 Claims. (Cl. 118—13)

This invention relates to food handling apparatus and more particularly to an apparatus for applying mayonnaise or a similar food substance to slices of sandwich bread and the like.

The principal object of the present invention is to provide a device for feeding and applying mayonnaise or the like to slices of sandwich bread where the slices of sandwich bread are carried by an endless belt and wherein the mayonnaise or the like is applied uniformly to each slice of bread over its entire exposed surface area and under scrupulously sanitary conditions.

A further object is to provide an apparatus for applying mayonnaise, or the like, to slices of sandwich bread carried on an endless belt and which is adapted to be readily cleaned and maintained in a sanitary condition, it being recalled that apparatus for the handling of food stuffs poses the vexatious problem of absolute cleanliness.

A further object of the present invention is to provide a device for applying mayonnaise or the like to slices of sandwich bread which is operated by an idling drum driven by an endless belt which carries the bread slices. A further object of the present invention is to provide a device of the character mentioned which is simple in construction and operation, which is easily demountable for purposes of cleaning, and which is arranged to meter the mayonnaise or the like to an applicating wheel in order to ensure uniform and precise distribution of the mayonnaise over the entire exposed surface of each slice of bread which the applicator wheel contacts.

Another object of the invention is to provide a mayonnaise applicating apparatus which is arranged to center each slice of bread relative to the applicating wheel.

Further objects and advantages will become apparent upon reading the following specification and referring to the accompanying drawings in which similar characters of reference represent corresponding parts in each of the several views.

Referring to the drawings.

Figure 1:
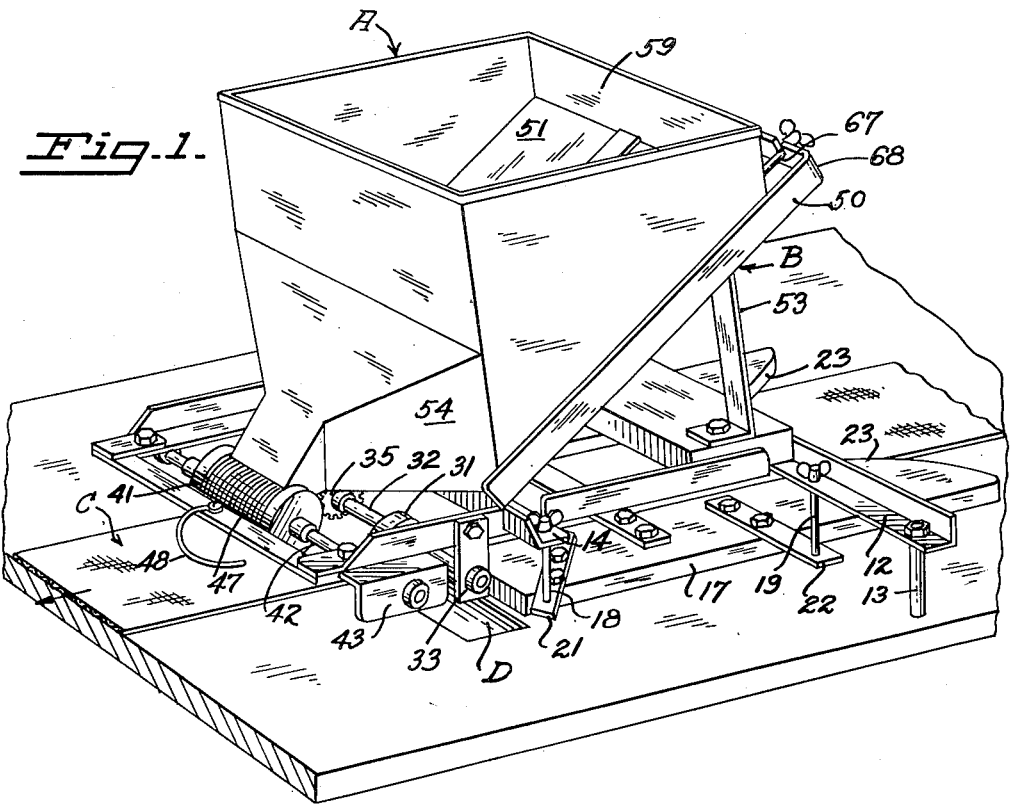
Fig. 1 is a perspective view of the mayonnaise applicator positioned over a moving endless belt.

The present invention is concerned with problems of handling sandwich bread and is particularly useful in the line production of sandwiches. Slices of bread are characterized as flexible, compressible and having the capacity of adherence to objects with which the slices are in contact and, therefore, the present invention has been designed with the aforementioned characteristics of bread in mind.

While throughout the present specification and claims reference is made to "bread" and "mayonnaise," it is to be understood that said terms are applicable to other products, such as cakes and similar pastries and spreads having a viscosity similar to mayonnaise.

Referring now to the drawings, the invention comprises essentially a hopper A, and carriage B arranged to be disposed over an endless traveling belt or equivalent C. The belt driving mechanism is not shown in the drawings and is conventional web belt or, preferably, a belt formed of suitable material and having a hard coating thereover in order to prevent too strict adherence of the bread thereto and to facilitate cleaning thereof.

As indicated in the drawings, the belt travels in the direction indicated by the arrow (Fig. 1). The back of the carriage comprises a laterally extending angle iron 12 from which depends spaced floor support posts 13. Thus the back of the device is supported directly from the floor. The angle iron 12 is arranged transversely of the belt C and extends laterally therefrom and is spaced above the belt.

Another angle iron 14 is disposed forwardly of member 12 and is parallel thereto and serves, with side members 15 and 16 and member 12, to comprise a first supporting frame for the mayonnaise applicating mechanism. Disposed below the frame members 12, 14, 15 and 16 and adjacent to opposite edges of the belt is a pair of guide members 17 and which said members are carried pivotally by the outer ends of cross frame members 12 and 14.

As illustrated, depending round studs 18 and 19 are carried respectively by members 14 and 12 and support slidably and rotatably adjacent to their bottom ends spaced plate members 21—22 carried by guide members 17.

Plate members 21 are disposed at an angle oblique to plate members 22 and the slidable and rotatable connections between plate members 21—22 and the respective stud members 18—19 enable the guide members 17 to move relative to the belt both laterally and longitudinally to a limited extent. The rearward ends of the guides 17 are curved or flared outwardly, as at 23, away from the belt to position better slices of bread carried by the belt relative to the mayonnaise applicating means, as will hereinafter appear.

Preferably, the stud members 18—19 are provided with wing nuts in order that the wing nuts may be utilized to raise and lower the guides relative to the traveling belt. As indicated in the drawings, the traveling belt C is supported by an idler drum D which rotates freely by frictional contact with the bottom of the traveling belt. Disposed above the drum D and in frictional contact therewith is a pair of spaced wheels 31, keyed to a shaft 32 which extends transversely of the carriage frame, said shaft being carried by said frame rotatably by means of bracket members 33 depending from members 15—16. The shaft 32 is in substantially vertical alignment with the axis of rotation of the drum D.

It will be noted that the back of the mayonnaise applicating apparatus is supported from the floor or other suitable structures by means of floor engaging posts 13 or equivalent. The forward part of the device is supported through wheels 31 which rest upon drum D. Thus, a greater part of the device rests directly upon wheels 31 to insure frictional contact between said wheels and the drum D. Further such an arrangement insures that a suitable pressure will be exerted downwardly on the bread slices by the applicating cylinder 41 and the bread feeder wheel 35.

A toothed feeder wheel 35 is keyed to the shaft between wheels 31 and in a position substantially medially of the width of the belt over which it is positioned. Preferably, the gear or toothed wheel 35 is formed of a light-weight material, such as plastic or light metal. The outer periphery of the toothed wheel 35 is spaced above the traveling belt a slightly less distance than the usual width of the slice of bread which the machine is arranged to handle in order that the said wheel 35 urges bread slices, carried by the belt, toward the applicating cylinder 41 disposed forwardly of said wheel 35.

Figure 3:
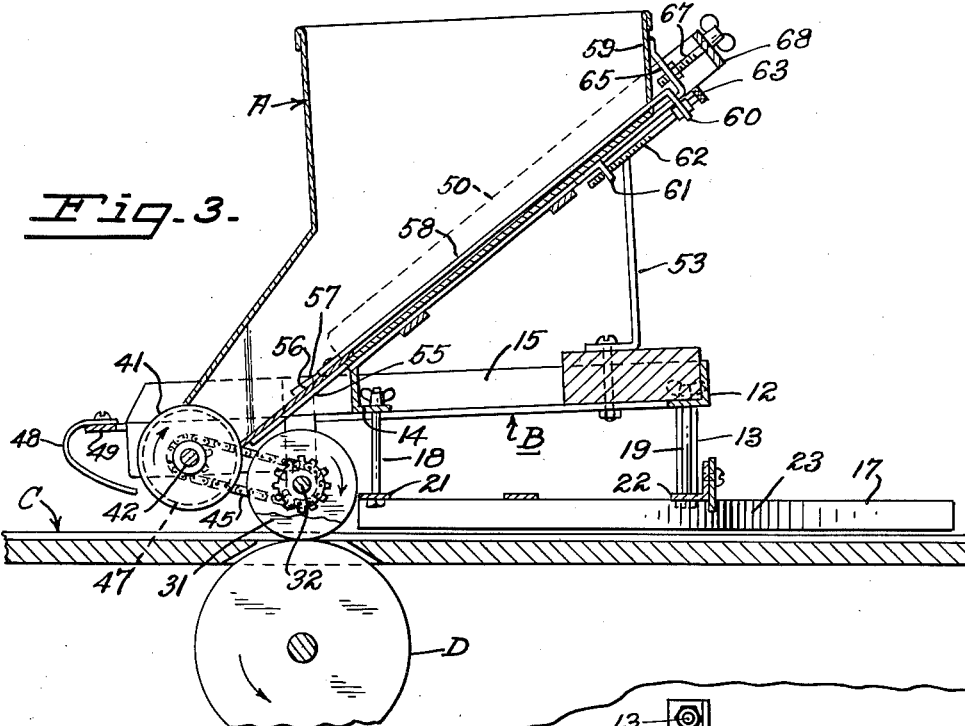
Fig. 3 is a sectional view, taken on line 3—3 of Fig. 2.
Figure 4:
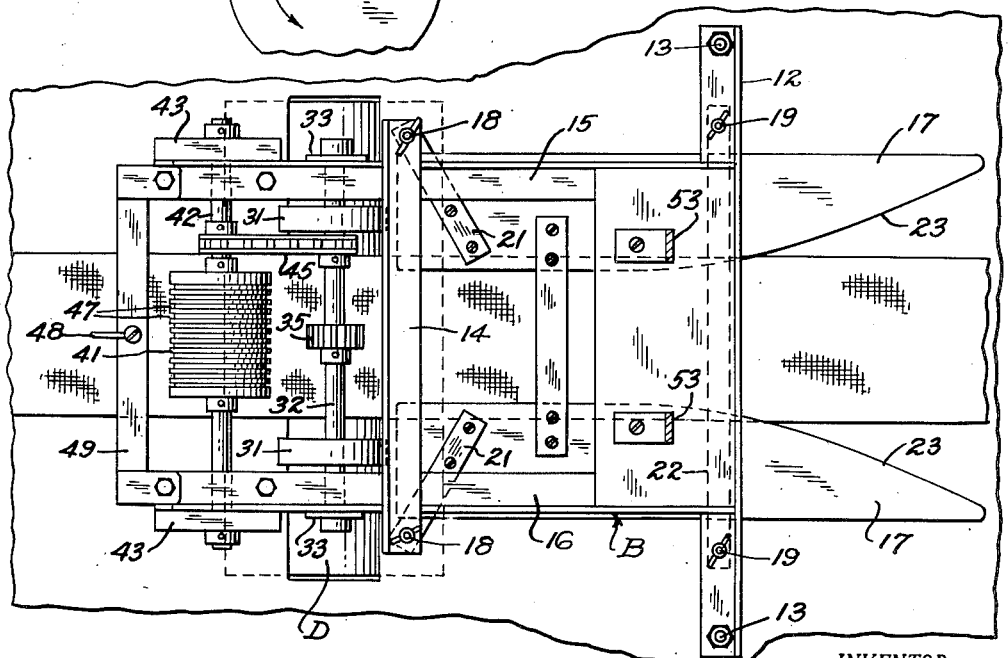
Fig. 4 is a top plan view of the apparatus disposed over a moving endless belt, with the hopper removed.

Disposed forwardly of the shaft 32 is a shaft 42 carried rotatably by flange members 43, which in turn are carried and depend from frame members 15 and 16. The applicating cylinder 41 is keyed to the shaft 42 to rotate therewith. A conventional chain connection, indicated at 45, transmits rotative movement from shaft 32 to shaft 42. Thus, referring to Fig. 3, as the belt moves in the direction of the arrow frictional contact with idler drum D causes said drum D to rotate about its axis in a counterclockwise direction. Wheels 31, in frictional contact with drum D, are thus caused to rotate in a clockwise direction and rotation of the shaft 32 is transmitted to shaft 42 to cause clockwise rotation of applicating cylinder 41, i. e. in the direction of movement of the belt. The arrangement and diameters of the several wheels mentioned is timed to the movement of the belt in order that the speed of rotation of applicating cylinder 41 is substantially the same as the speed of line movement of the belt.

The applicating cylinder 41 is provided with a plurality of spaced peripheral grooves 47 for the purpose of effecting uniform distribution of mayonnaise which feeds, by gravity, from the hopper onto the revolving cylinder 41. The arrangement of the distributing grooves 47 has been found to distribute the mayonnaise evenly over the slices of bread passing therebeneath and effects a metered uniform application of the mayonnaise. A piece of wire or the like, bent generally in the shape of a U and indicated at 48, is carried by a forward front frame cross member 49 disposed in front of an applicating cylinder. The free end of the member 48 is arranged in close proximity to the periphery of the applicating cylinder and approximately medially thereof and serves to strip slices of bread from said applicating cylinder should the slices tend to adhere to said cylinder and revolve therewith.

The hopper A is provided with an inclined floor, indicated generally at 51, disposed above the first frame and supported slidably by a rectangular inclined angle iron frame, indicated generally at 50. Frame member 14 and a vertical support 53 carried by the first frame support the frame 50.

Figure 2:
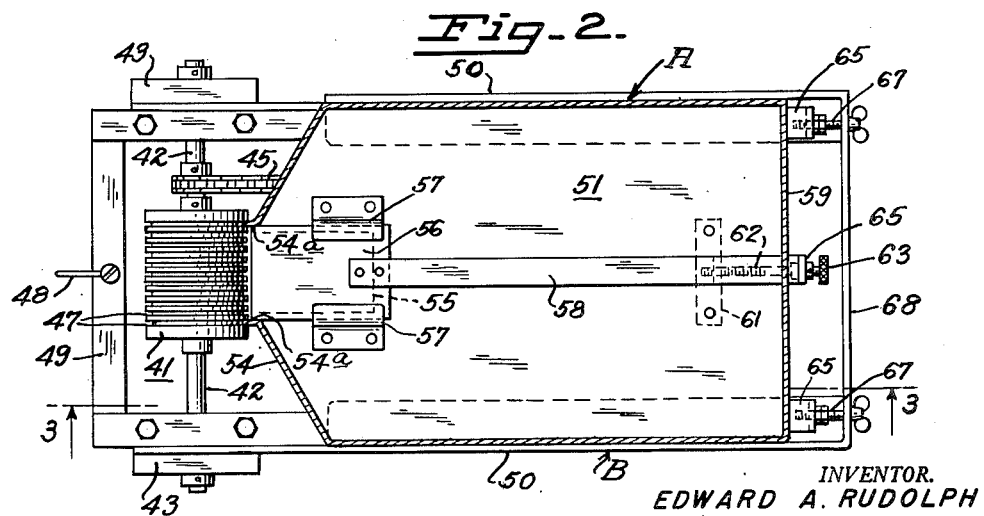
Fig. 2 is a top plan view of the device with the hopper attached, said hopper being illustrated in section.

The forward bottom part of the hopper funnels mayonnaise to the grooved applicating surface of the cylinder 41 through a restricted throat portion 54. The side walls of the restricted throat 54 are formed with forwardly projecting flanges 54ª which are received slidably in the outermost grooves 47 of the applicating cylinder 41 as is indicated in Fig. 2. Thus, coaction of the flanges 54ª with the outermost grooves of the applicating cylinder prevents leakage of mayonnaise endwise of the applicating cylinder. The floor of the throat is cut away, as at 55, and overlying the cutaway portion of the floor is a gate 56, disposed slidably beneath clip members 57 affixed to the floor. A shank 58 is connected to the gate 56 and protrudes slidably through a back wall 59 of the hopper. The shank member 58 is bent at right angles to the longitudinal axis thereof exteriorly of the hopper, as at 60. A flange 61 is mounted upon the bottom of the floor 51 and receives a threaded screw member 62, provided with a knurled head 63. The screw member 62 is journaled in the portion 60 of shank 58 and connected threadedly to the flange 61. Thus, by turning the knurled head 63 the gate may be moved toward and away from the applicator cylinder 41 in order to meter mayonnaise to the applicating surface thereof in proper fashion.

In addition to the gate mechanism hereinabove referred to, there is a pair of spaced clip members 65 carried by the back wall 59 of the hopper. A pair of adjusting screws 67 are connected threadedly to the back member 68 of frame 50 and coact threadedly with the clips 65 in order to effect movement of the hopper per se toward and away from the applicating cylinder 41 and also serve as the means to hold removably the hopper in position during use and enable convenient removal of the hopper for cleaning.

In operation, the hopper is placed in the frame 50 and screw members 67 adjusted so that the discharge throat 54 is in close proximity to the grooved applicating surface of the cylinder 51. Gate adjusting screw 62 is then manipulated to adjust the gate 56 relative to the applicating surface of the cylinder. The slices of bread carried on the moving belt then travel in the direction of the applicating cylinder and are centered by means of the guide members 17. The grooved applicating cylinder revolves in a clockwise direction through the action of cooperating drum D, wheels 31 and associated mechanism at substantially the same speed as the belt and in the same direction. The slices of bread carried by the belt pass under toothed feeder wheel 35 and are urged thereby toward the applicating cylinder and thence pass therebelow, and while passing below the applicating cylinder are coated with mayonnaise by the grooved applicating surface of the cylinder 41 in a uniform fashion.

In the event a slice of bread tends to adhere to the coated surface of the cylinder 41, it is stripped therefrom by means of the member 48 and travels to the next belt station. The mayonnaise feeds by gravity from the hopper to cylinder 41 and is picked up by the grooved cylinder and thence applied evenly to the slices of bread passing thereunder.

It has been found that the use of the spaced parallel grooves on the applicating surface of the cylinder insures an even distribution of the viscous spread over the bread slices without waste.

The invention has been described in detail with reference to the drawings and by way of example for purposes of clarity of description, and it is understood that various changes, modifications, alterations in structure, assembly and use may be practiced without departing from the spirit of the invention and scope of the claims.

I claim:

1. A mayonnaise applicating device comprising a rotatable applicating cylinder provided with a plurality of spaced peripheral grooves, a hopper having a restricted discharge throat in flow communication with the grooved portion of said applicating cylinder, means carried by said discharge throat to coact with grooves of said applicating cylinder to prevent endwise leakage of mayonnaise from said applicating cylinder, and means to adjust the flow of mayonnaise from said hopper to said applicating cylinder comprising an adjustable gate, said applicating cylinder positioned above an endless traveling belt to contact rotatably a slice of bread traveling therebeneath and to deposit mayonnaise uniformly thereon.

2. The combination with an endless traveling belt of apparatus for applying mayonnaise to slices of bread carried by the endless belt comprising an applicating cylinder provided with a plurality of spaced peripheral grooves, a hopper having a discharge throat in flow communication with said applicating cylinder, means carried by said discharge throat to coact with some of said grooves of said applicating cylinder to prevent leakage of mayonnaise therefrom, means to rotate said applicating cylinder upon movement of said endless belt, means to meter mayonnaise from said hopper to said applicating cylinder comprising a movable gate and means to move said gate, and a bread slice feeder wheel disposed above said belt and operative upon movement of said endless belt to rotate and urge a bread slice deposited therebeneath toward said applicating cylinder.

3. The combination with an endless traveling belt of apparatus for applying mayonnaise to slices of bread carried by the endless belt comprising an applicating cylinder provided with a plurality of spaced peripheral grooves positioned above said belt to contact a slice of bread passing therebeneath and to deposit mayonnaise thereon, a hopper having a discharge throat in flow communication with said applicating cylinder, means to rotate said applicating cylinder operative upon movement of said endless belt, and means carried by said discharge throat to coact with some of said grooves of said applicating cylinder to prevent leakage of mayonnaise endwise therefrom.

4. The combination with an endless traveling belt of apparatus for applying mayonnaise to slices of bread carried by the endless belt comprising applicating means positioned above said belt to contact a slice of bread passing therebeneath and to deposit mayonnaise thereon, a hopper in flow communication with said applicating means, and means disposed on opposite sides and above the endless belt to position slices of bread carried by the belt prior to engagement with the applicating means, said means comprising members mounted for limited lateral displacement relative to the belt upon contact with bread slices carried by said belt.

5. The combination with an endless traveling belt of apparatus for applying mayonnaise to slices of bread carried by the endless belt comprising an applicating cylinder positioned above said belt to contact a slice of bread passing therebeneath and to deposit mayonnaise thereon, a hopper in flow communication with said applicating cylinder, means to rotate said applicating cylinder operative upon movement of said endless belt, and means to position slices of bread carried by said endless belt prior to engagement of the said bread slices with the applicating cylinder, said last named means comprising members mounted on means mounted above and adjacent to opposite sides of said endless belt to enable limited lateral movement of said members relative to the belt upon contact of said members with bread slices carried by said belt.

EDWARD ALBERT RUDOLPH.

REFERENCES CITED

The following references are of record in the file of this patent:

UNITED STATES PATENTS

| Number | Name | Date |
| --- | --- | --- |
| 470,200 | Kiddie | Mar. 8, 1892 |
| 824,202 | Peters | June 26, 1906 |
| 1,065,376 | Leitgeb | June 24, 1913 |
| 1,666,335 | Lentz | Apr. 17, 1928 |
| 1,816,535 | Joachimson | July 28, 1931 |
| 2,439,899 | Monaco | Apr. 20, 1948 |